United States Patent [19]
Berry

[11] Patent Number: 5,361,727
[45] Date of Patent: Nov. 8, 1994

[54] POULTRY HARVESTER

[75] Inventor: Paul S. Berry, Bedford, England

[73] Assignee: British Technology Group Limited, London, England

[21] Appl. No.: 78,177

[22] PCT Filed: Oct. 12, 1992

[86] PCT No.: PCT/GB92/01859

§ 371 Date: Jun. 17, 1993

§ 192(e) Date: Jun. 17, 1993

[87] PCT Pub. No.: WO 93/07743

PCT Pub. Date: Apr. 29, 1993

[30] Foreign Application Priority Data

Oct. 17, 1991 [GB] United Kingdom ................. 9122074

[51] Int. Cl.[5] ............................................. A01K 29/00
[52] U.S. Cl. .................................................. 119/846
[58] Field of Search ............... 119/845, 846; 56/327.1, 56/328.1

[56] References Cited

U.S. PATENT DOCUMENTS

| | | | |
|---|---|---|---|
| 2,928,225 | 3/1960 | Spencer | 56/328.1 |
| 4,508,062 | 4/1985 | Berry et al. | |
| 4,513,689 | 4/1985 | Berry et al. | |
| 4,860,529 | 8/1989 | Peterson et al. | 56/328.1 X |
| 4,900,292 | 2/1990 | Berry et al. | 474/a84 |

FOREIGN PATENT DOCUMENTS

| | | |
|---|---|---|
| 481800 | 4/1992 | European Pat. Off. . |
| 1192976 | 10/1959 | France . |
| 2411106 | 7/1979 | France . |
| 756250 | 9/1956 | United Kingdom . |
| 2128870 | 5/1984 | United Kingdom . |
| 2205917 | 10/1990 | United Kingdom . |
| 2251227 | 7/1992 | United Kingdom . |

Primary Examiner—Robert P. Swiatek
Attorney, Agent, or Firm—Cushman, Darby & Cushman

[57] ABSTRACT

A poultry harvester has a pick-up head feeding birds from the front end of the harvester onto a conveyor belt. The pick-up head includes a three-rotor array with the poultry-handling elements on each rotor abutting and/or intermeshing with the elements of the other two rotors of the array. Stationary side walls flank both sides of the conveyor belt and barrier loops extend away from these sides wall to interdigitate with the guide elements of the rotors and embrace the cores of these rotors. This prevents birds from being pulled between the side walls and the adjacent rotors. A similar arrangement may also be used at the rear end of the harvester.

9 Claims, 2 Drawing Sheets

POULTRY HARVESTER

BACKGROUND OF THE INVENTION

The present invention relates to poultry harvesters.

GB Patent 2205917 (National Research Development Corporation) discloses poultry harvesters in which a conveyor belt transfers birds from a poultry-handling assembly at the front of the harvester to an end location at the back of the harvester.

In harvesters of this type, the poultry-handling assembly comprises two inwardly and outwardly counter-rotating poultry pick-up rotors arranged side-by-side with a continuous array of flexible bird-engaging guide elements on each rotor, abutting and/or intermeshing with the guide elements on the other rotor. The pick-up rotors at the front of the harvester function to pick up birds from the floor and transfer them into the harvester.

Stationary walls flank the sides of the conveyor in order to prevent the escape of the birds travelling along the conveyor, and it is known to have barrier combs extending from the side walls of the conveyor to interdigitate with the guide elements of the pick-up rotors. These combs ensure that the birds are removed from the poultry-handling assembly onto the conveyor. If these combs were not fitted, there would be a possibility of the birds continuing round the pick-up rotors and being ejected from the sides of the pick-up rotors.

The combs used to date consist of columns of straight rigid teeth which point forwardly into the associated pick-up rotors and are positioned accurately between the rows of flexible guide elements projecting from the cores of the rotors. The distal ends of the teeth end as close as possible to the cores of the rotors. It is a drawback of this design, however, that if the comb teeth become out of position so that they will no longer function correctly, the birds can become trapped between the pick-up rotors and the side walls, resulting in the blockage of the machine and the likelihood of injury to the birds. Similar problems can occur when pick-up rotors are used at the rear of the harvester to discharge birds from the conveyor.

SUMMARY OF THE INVENTION

The present invention provides a poultry harvester comprising two counter-rotating poultry pick-up rotors, arranged side-by-side with a continuous array of flexible bird-engaging guide elements supported by core portions on each rotor, abutting and/or intermeshing with similar guide elements on the other rotor, a conveyor for transferring the birds to or from the pick-up rotors, stationary side walls flanking both sides of the conveyor, and barrier means extending away from the side walls to interdigitate with the rotor guide elements and at least in part embrace the cores of the rotors so as to prevent birds from being pulled between the side walls and said cores.

The barrier means completely encircle the rotor cores. The number of barrier means embracing the rotors will depend upon the size of the birds being harvested. Preferably, when the harvester is intended for harvesting broilers, the guide elements are arranged in rows and there is at least one such barrier means extending at least between every third, preferably every alternate, and more preferably every row of guide elements.

The barrier means are provided by loops of metal, plastics and/or any other suitable material, e.g. rubber loops extending from the side walls around the adjacent rotor cores. The pick-up rotors may be located at the front and/or back ends of the harvester.

BRIEF DESCRIPTION OF THE DRAWINGS

Embodiments of the invention will now be shown, by way of example only, with reference to the accompanying drawings in which.

DETAILED DESCRIPTION OF THE PRESENTLY PREFERRED EXEMPLARY EMBODIMENT

Figure 1:
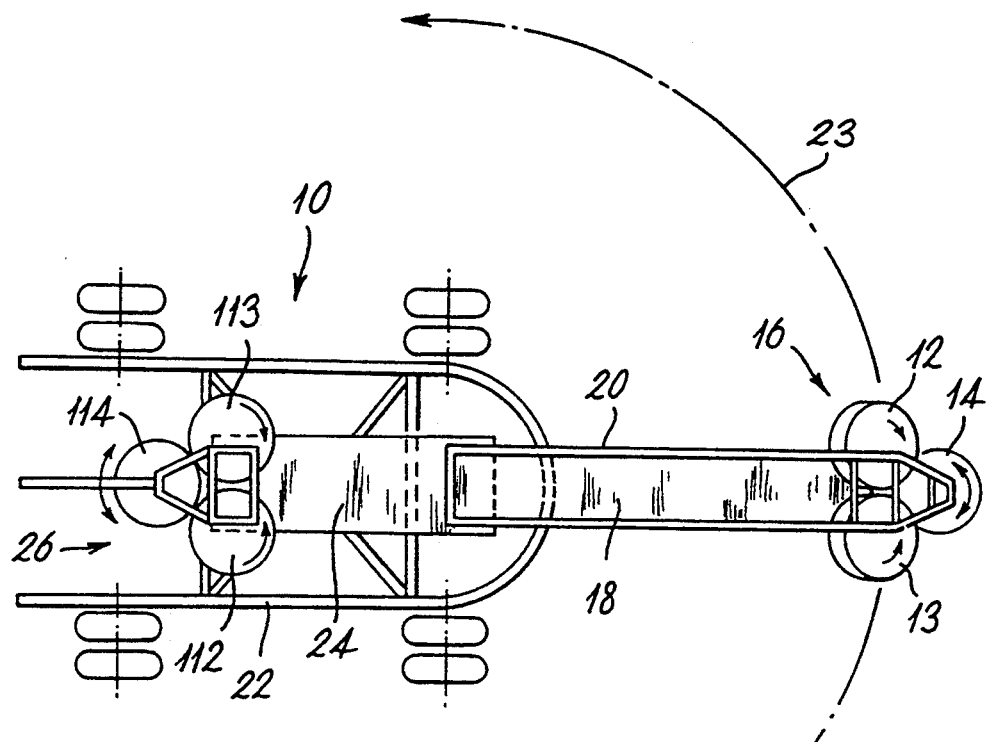
FIGS. 1 and 2 are plan and side views of a broiler harvester according to the present invention.
Figure 2:
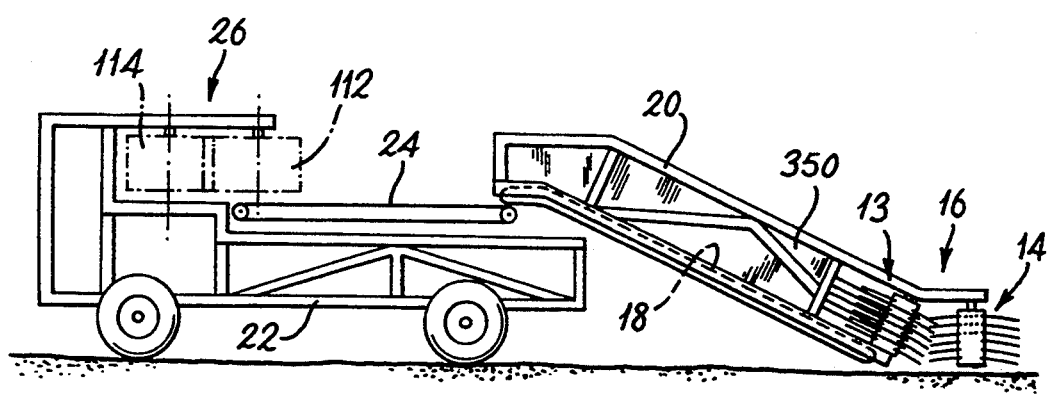

Referring first to FIGS. 1 and 2, a mobile bird-harvester 10, in accordance with the present invention, comprises three rotors 12,13,14 mounted in a triangular formation to provide a pick-up head 16 at the front end of the harvester. Each of the rotors 12,13,14 provides an array of flexible rubber fingers of the sort currently used for plucking chicken carcasses.

Figure 5:
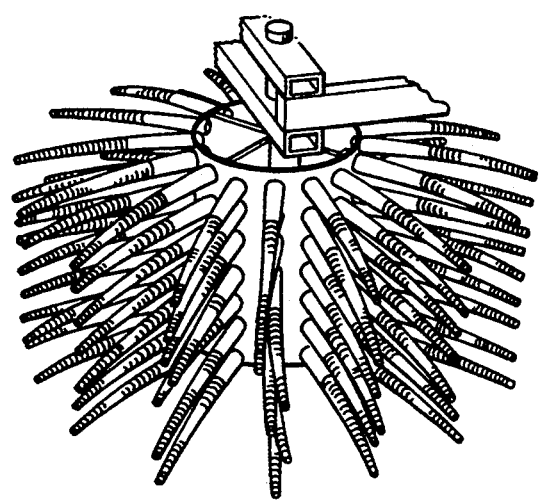
FIG. 5 is a detailed view of a preferred form of rotor used in the harvester pick-up head and discharge assemblies of FIGS. 1 to 4.

One such rotor is shown in detail in FIG. 5 of the drawings from which it will be seen that each finger comprises a smooth root portion (adjacent a supporting drum member) and a corrugated end portion. Typically the fingers will taper from an initial diameter of about 25 mm to a final diameter of about 12 mm at the tip. The overall finger length is typically about 235 mm giving rise to an overlap of about 50 mm at the position of maximum intermesh between the two rotors. The resilient nature of the finger material allows the fingers to be pushed into appropriate apertures in the two drum members, a peripheral groove in the root portion of each finger ensuring that the finger locks securely into place in the drum aperture.

Further details of these rotors may be had from U.S. Pat. No. 2,128,870 (National Research Development Corporation).

Behind the pick-up head 16, is an angled upwardly moving conveyor belt 18. The support frame for belt 18 is provided by a scanning arm 20, the upper end of which is pivotally mounted on the harvester chassis 22 to allow the arm to scan over an arc 23, and the lower end of which is optionally carried on pivoting ground-support wheels.

At its upper end, the conveyor belt 18 discharges onto a second conveyor belt 24 at the rear end of which is a 3-rotor discharge assembly 26. This latter is of the same, or essentially the same, configuration and rotor design as pick-up head 16 except that the end rotor (114) now trails the other two rotors (112,113) and all three rotors rotate about vertical axes. This last requirement distinguishes the discharge assembly from the pick-up head 16 where only the end rotor 14 rotates about a vertical axis and the other two rotors 12,13 rotate about upwardly and forwardly inclined axes lying perpendicular to the support surface of inclined belt 18.

Further details of the rotor assemblies and the working of the broiler harvester incorporating such rotors can be found in U.S. Pat. No. 2,205,917 (National Research Development Corporation).

Figure 3:
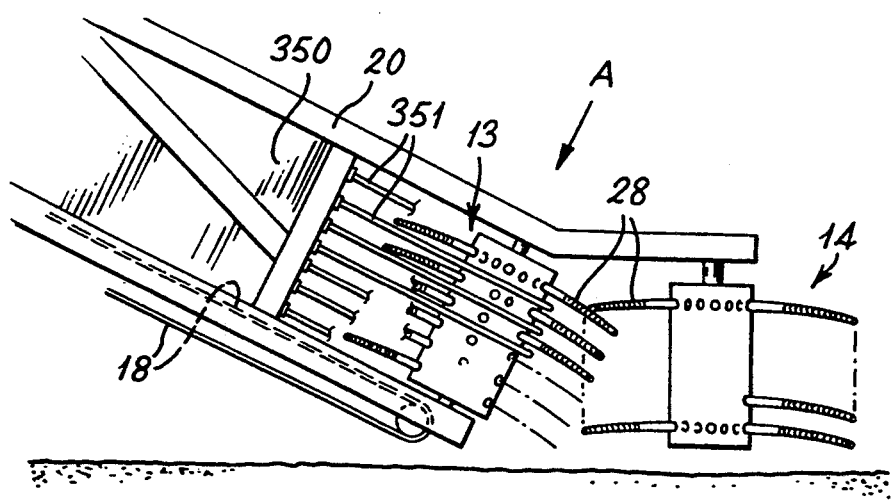
FIGS. 3 and 4 are more detailed side and perspective views of a preferred form of the harvester front end.
Figure 4:
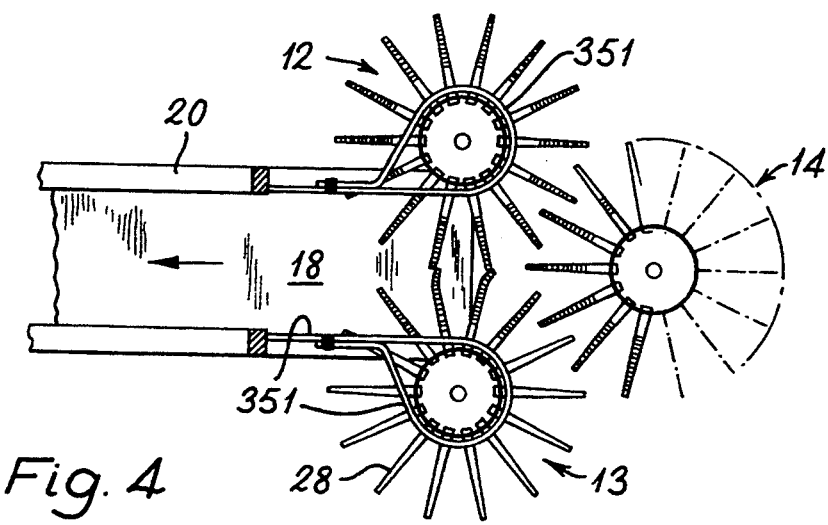

FIGS. 3 and 4 of the drawings, show details of a preferred design for the front end of the illustrated harvester constructed in accordance with the teachings of the present invention but omitted from the other Figures for reasons of clarity.

Thus referring now to FIGS. 3 and 4, it will be seen that the bottom ends of the side walls 350 to the conveyor belt 18 are fitted with plastics or metal extensions 351 which provide a "comb" structure encircling the core regions of the rotors 12,13 and interdigitating with the guide elements 28 on these rotors. The purpose of these extensions is to provide a barrier which removes any possibility of the birds being pulled between the ends of the side walls and the adjacent rotors, rather than being successfully transferred from the pick-up head on to the conveyor belt. In an alternative design (not shown), the extensions extend adjacent the conveyor belt 18 only part of the way around the two rotor cores.

Further comb structures may be fitted for each of the rotors 112,113 at the rear end of the harvester to prevent birds from being pulled into the spaces between these rotors and stationary side walls (not shown) for the rear elevator belt 24. These further comb structures can be virtually identical to the preferred or alternative designs described in the preceding paragraph although they will, of course, be differently orientated to take account of the difference in attitude between rotors 12,13 on the one hand, and rotors 112,113 on the other hand.

What is claimed is:

1. A poultry harvester comprising: two counter-rotating poultry pick-up rotors arranged side-by-side with a continuous array of flexible bird-engaging guide elements supported by core portions on each rotor abutting and/or intermeshing with similar guide elements on the other rotor; a conveyor for transferring the birds to or from the pick-up rotors; stationary side walls flanking both sides of the conveyor; and barrier means extending away from the side walls to interdigitate with the rotor guide elements and at least in part embrace the core portions of the rotors so as to prevent birds from being pulled between the side walls and said core portions.

2. A poultry harvester according to claim 1, wherein the barrier means completely encircle the rotor core portions.

3. A poultry harvester according to claim 1 or 2, wherein the barrier means are provided by metal and/or plastics loops extending from the side walls around the adjacent rotor core portions.

4. A poultry harvester according to claim 1, wherein the barrier means extend at least between every third row of guide elements.

5. A poultry harvester according to claim 1, wherein the barrier means extend at least between every alternate row of guide elements.

6. A poultry harvester according to claim 1, wherein the barrier means extend between every row of guide elements.

7. A poultry harvester according to claim 1, wherein the pick-up rotors are located at the front and back end of the harvester.

8. A poultry harvester according to claim 1, wherein the pick-up rotors are located at the front end of the harvester.

9. A poultry harvester according to claim 1, wherein the pick-up rotors are located at the back end of the harvester.

* * * * *